US012536781B2

(12) United States Patent
Mani et al.

(10) Patent No.: US 12,536,781 B2
(45) Date of Patent: Jan. 27, 2026

(54) SYSTEM AND METHOD FOR AUTOMATICALLY LABELLING MEDIA (71) Applicant: DIGIT7 INDIA PRIVATE LIMITED, Richardson, TX (US)

(72) Inventors: Chithrai Selvakumar Mani, Richardson, TX (US); Nithesh Singh Sanjay, Richardson, TX (US); Ria Mahua Ghosh, Plano, TX (US)

(73) Assignee: DIGIT7 INDIA PRIVATE LIMITED

( * ) Notice: Subject to any disclaimer, the term of this patent is extended or adjusted under 35 U.S.C. 154(b) by 496 days.

(21) Appl. No.: 17/932,063

(22) Filed: Sep. 14, 2022

(65) Prior Publication Data

US 2024/0087298 A1  Mar. 14, 2024

(51) Int. Cl.
*G06V 10/774* (2022.01)
*G06V 10/776* (2022.01)
*G06V 10/82* (2022.01)

(52) U.S. Cl.
CPC ........ *G06V 10/7747* (2022.01); *G06V 10/776* (2022.01); *G06V 10/82* (2022.01)

(58) Field of Classification Search
CPC .. G06V 10/7747; G06V 10/776; G06V 10/82; G06V 20/70; G06V 10/7788
See application file for complete search history.

(56) References Cited

U.S. PATENT DOCUMENTS

| 9,652,460 | B1 | | 5/2017 | Barisic et al. | |
|---|---|---|---|---|---|
| 11,443,232 | B1 | * | 9/2022 | Rahman | G06F 18/2148 |
| 11,481,906 | B1 | * | 10/2022 | Narayanan | G06V 10/7753 |
| 2016/0034512 | A1 | * | 2/2016 | Singhal | G06F 16/35 707/741 |
| 2021/0117775 | A1 | * | 4/2021 | Zlotnick | G06F 18/2431 |
| 2021/0357303 | A1 | * | 11/2021 | Weissinger | G06F 16/9535 |
| 2022/0114480 | A1 | * | 4/2022 | Kim | G06F 16/2379 |
| 2023/0023164 | A1 | * | 1/2023 | Parameswaran | G06V 10/7753 |
| 2023/0195845 | A1 | * | 6/2023 | Dasgupta | G06N 3/08 706/12 |

(Continued)

FOREIGN PATENT DOCUMENTS

| CN | 108509457 A | 9/2018 |
|---|---|---|
| CN | 110276369 B | 7/2021 |
| WO | 2018157746 A1 | 9/2018 |

OTHER PUBLICATIONS

Bilen Hakan, Pedersoli Marco, Tuytelaars Tinne; Weakly Supervised Object Detection with Posterior Regularization; Ku Leuven, ESAT-PSI, iMinds Leuven, Belgium; 2014.

(Continued)

*Primary Examiner* — Jennifer Mehmood
*Assistant Examiner* — Vaisali Rao Koppolu (57) ABSTRACT

The improved system and method disclosed herein includes training an auto-labelling engine in a plurality of iterations until a performance of the auto-labelling engine is satisfactory. The auto-labelling engine is trained based on a combination of a plurality of manually annotated first media and a plurality of second media without annotation. The method further includes receiving at least one media for labelling and using the trained auto-labeling engine to draw at least one bounding box around at least one object in the received at least one media for labelling the at least one object in the at least one media.

13 Claims, 4 Drawing Sheets

(56) References Cited

U.S. PATENT DOCUMENTS

2023/0260257 A1* 8/2023 Verbeke ............... G06V 10/774
                                                382/156
2023/0260262 A1* 8/2023 Martinez .............. G06V 10/751
                                                382/159
2023/0334814 A1* 10/2023 Ranganathan ......... G06V 10/82

OTHER PUBLICATIONS

Oshea Keiron, Nash Ryan; An Introduction to Convolutional Neural Networks; arXiv:1511.08458v2; Dec. 2, 2015.
Pan Sinno, Yang Qiang; A Survey on Transfer Learning; IEEE Transactions on Knowledge and Data Engineering; vol. 22 No. 10; Oct. 2010.
Papadopoulos Dim, Uijlings Jasper, Keller Frank, Ferrari Vittorio; Training object class detectors with click supervision; arXiv:1704.06189v2; May 19, 2017.
Redmon Joseph, Divvala Santosh, Girschick Ross, Farhadi Ali; You Only Look Once: Unified, Real-Time Object Detection; arXiv:1506.02640v5; May 9, 2016; available at https://pjreddie.com/darknet/yolo/.
Shi Zhiyuan, Siva Parthipan, Xiang Tao; Transfer Learning by Ranking for Weakly Supervised Object Annotation; School of Electronic Engineering and Computer Science, Queen Mary, University of London, UK; Jul. 21, 2012.
WIPO ISA (India Patent Office); PCT/ISA/210—International Search Report; Dec. 6, 2023; WIPO.
WIPO ISA (India Patent Office); PCT/ISA/237 Written Opinion; Dec. 6, 2023; WIPO.

* cited by examiner

SYSTEM AND METHOD FOR AUTOMATICALLY LABELLING MEDIA

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable

STATEMENT REGARDING PRIOR DISCLOSURES BY THE INVENTOR OR A JOINT INVENTOR

Not Applicable

BACKGROUND OF THE INVENTION

Bounding boxes are a conventional image annotation method utilized in machine learning, deep learning, and computer vision image identification applications, among others. A depiction of the results of this approach is presented in FIGS. 1 and 2, where these bounding boxes are used to outline/annotate/label objects, classify the objects and localize the objects present within the image according to application-specific requirements.

Figure 1:
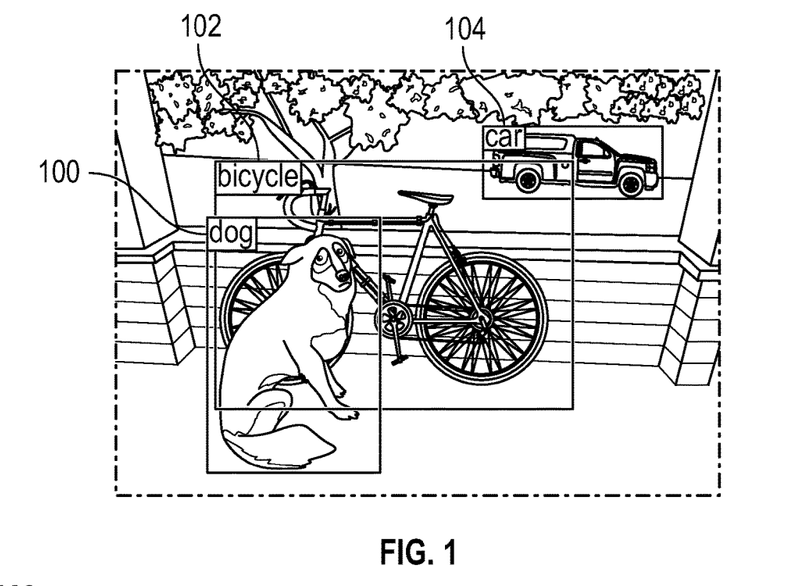
FIG. 1 depicts a conventional approach to drawing bounding boxes/labelling images using a manual process with a small number of objects, namely a dog, bicycle, and car.
Figure 2:
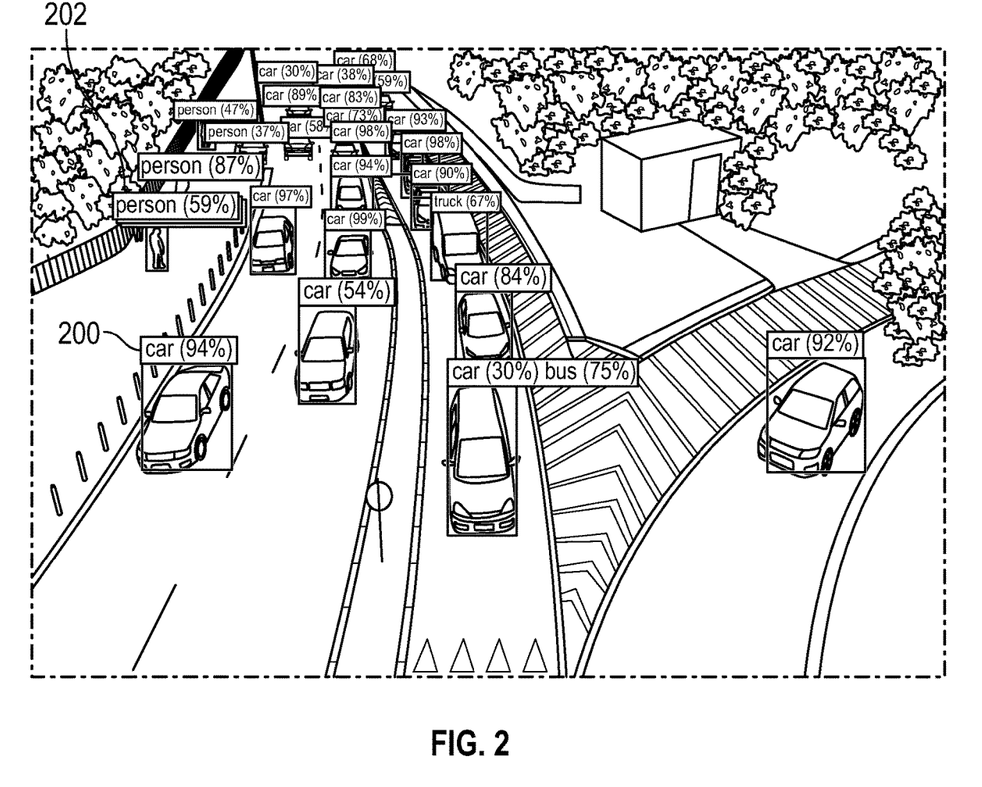
FIG. 2 depicts another conventional approach to drawing bounding boxes/labelling images using a manual process with a large number of objects, namely, automobiles and pedestrians in a congested urban setting.

FIG. 1 presents a scene with three objects of interest, namely, a dog (100), a bicycle (102), and an automobile (104). Shown are rectangles drawn around each with a corresponding label ("dog," "bicycle," and "car") assigned to the upper left corner of the rectangle. In FIG. 2 a multitude of objects of interest, namely, automobiles (200) and pedestrians (202), are present. Each auto and each pedestrian are identified and a frame is drawn around each with a corresponding label attached.

This conventional approach involves an operator manually drawing the bounding boxes around the objects present in the image. However, such efforts can become quite time-consuming depending on a number of objects present in the image, and may even require months to years for very large image dataset comprising thousands or millions of images. Thus, this conventional drawing and annotating method tends to be extremely time consuming and stressful, and is highly inefficient with regard to time, effort, and utilization. What is needed is a system and method for object-of-interest identification, framing, and annotation that is capable of processing very large datasets quickly, surmounting the above stated shortcomings.

TECHNICAL FIELD

The embodiments herein relate to media labelling and annotation methods and, more particularly, to systems and methods for automatically labelling objects in electronic media with minimal manual effort.

BRIEF SUMMARY OF THE INVENTION

The invention disclosed and described herein unveils a novel system and method for automatically labelling objects present in electronic media. The invention addresses the inefficiencies and inaccuracies of traditional manual and other object identification by utilization of a specially and uniquely trained auto-labelling engine as a part of an electronic device including memory, interface connectivity, user display, and a programmable controller for receiving training and other datasets upon which operation is required and desired.

Training begins with a first dataset containing a plurality of objects that are pre-annotated, and a second dataset containing a plurality of unannotated objects. The auto-labelling engine assigns a label to each unannotated object based upon comparisons with the annotated objects and presents this to a user for review. If the electronic device receives a satisfactory performance review indication from the user the auto-labelling engine is considered trained and is used for subsequent object annotation. However, if the electronic device receives an unsatisfactory performance review the training continues on an iterative basis until satisfactory performance is achieved. On each iteration the size of the dataset containing initial annotated first objects is reduced from the previous iteration until satisfactory performance is indicated. Various embodiments include additional devices for supplying datasets and added capability of labelling and drawing bounding boxes around each object The novel features that are considered as characteristic for the invention are set forth particularly in the appended claims. The invention itself, however, both as to its construction and methods of operation, together with additional objects and advantages thereof, will be best understood from the following description of specific embodiments when read with the accompanying drawings.

BRIEF DESCRIPTION OF THE SEVERAL VIEWS OF THE DRAWING(S)

The present invention may be more fully understood by reference to the following detailed description of the preferred embodiments of the invention when read in conjunction with the accompanying drawings, wherein.

The above figures are provided for illustration and description only, and are not intended to limit the disclosed invention. Use of the same reference number in multiple figures is intended to designate the same or similar parts. Furthermore, if, and when, the terms "top," "bottom," "first," "second," "upper," "lower," "height," "width," "length," "end," "side," "horizontal," "vertical," and similar terms are used herein, these terms are intended to reference only the structure shown in the drawing to facilitate describing the specific embodiment. The extension of the figures with respect to number, position, relationship, and dimensions of the parts to form the preferred embodiment will be explained or will be within the skill of the art after the following teachings of the present invention have been thoughtfully considered.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

As used herein "computer readable medium" means any tangible portable or fixed RAM or ROM device, such as portable flash memory, a CDROM, a DVDROM, embedded RAM or ROM integrated circuit devices, or the like.

Referring now to the drawings, and more particularly to FIGS. 3 through 7, where similar reference characters denote corresponding features consistently throughout the figures, there are shown embodiments.

Figure 3:
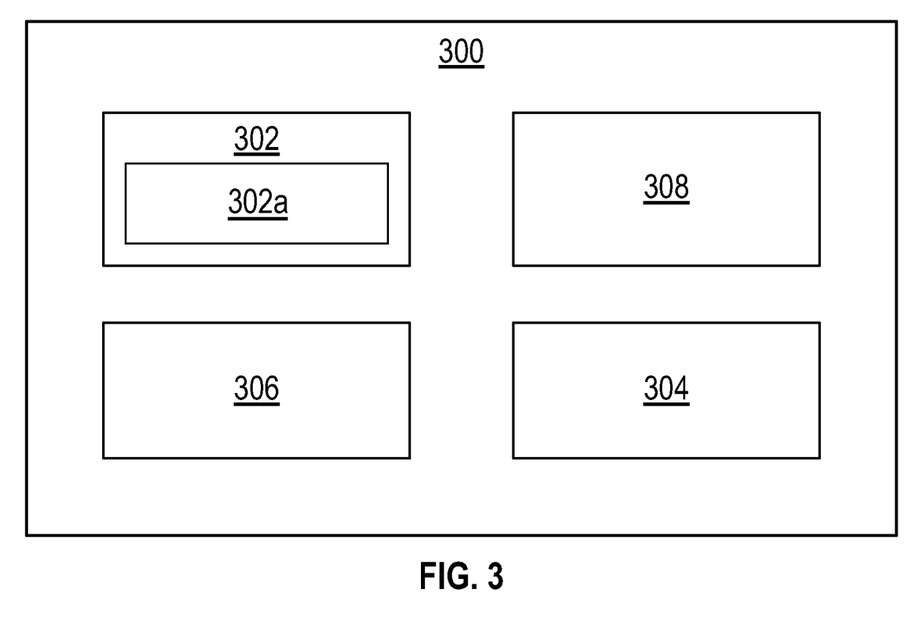
FIG. 3 depicts a block diagram representation of an electronic device for automatically labelling objects in media, according to embodiments as disclosed herein.

FIG. 3 depicts a programmable electronic device (300) for automatically labelling objects in electronic media, according to embodiments as disclosed herein. This electronic device (300) is adapted to automatically label/annotate the one or more objects present in the media. Examples of the electronic device (300) structure may be, but are not limited to a computer server, a personal computing device, a cloud computing device (may be a part of a public cloud or a private cloud), a multiprocessor system, a microprocessor based programmable computer, a minicomputer, a mainframe computer, a database, or any other device capable of executing program instructions to achieve labelling the objects presents in the media. For example, the server may be at least one of, but is not limited to, a standalone server, a server on a cloud, a bank of servers, or some combination thereof. In another example, the computing device may be at least one of, but is not limited to, a personal computer, a notebook, a tablet, desktop computer, a laptop, a handheld device, a mobile device, a medical device, and so on. Also, the electronic device 200 may be at least one of, a microcontroller, a processor, a System on Chip (SoC), an integrated chip (IC), a microprocessor based programmable consumer electronic device, or the like.

Examples of the electronic media objects ("objects") may be, but are not limited to, people, animals, items, retail products, vehicles, and the like, or some combination thereof. Examples of the electronic media ("media") may be, but are not limited to, a digital images, videos, digital animations, Graphic Interchange Format (GIF) files or the like, direct camera output video feeds, buffered video feeds, or some combination thereof.

The electronic device (300) automatically labels the one or more objects in the media by drawing virtual bounding boxes around the one or more objects in the media. The bounding boxes may outline the objects in boxes in accordance with requirements of applications in which the objects have to be labelled. Examples of the applications may be, but are not limited to, autonomous vehicle driving, retail clothing, furniture detection and satellite imagery, analysis of drone and robotics imagery, indoor object detection, retail stores (for example, tracking customers and objects bought by customers), traffic analysis, weather pattern analysis, object detection in medical labs, farming (crop identification and sorting), and the like. In an embodiment, the phrases such as "labelling the media", "drawing the bounding boxes around the objects in the media", "media data labelling", and so on, are used interchangeably to refer to labelling of the objects in the media.

The electronic device (300) embodiment includes a memory (302), an interface (304), a display (306), and a controller (308). The electronic device (300) may also be communicatively coupled with one or more, or combination of, external electronic devices (for example, a server, a database, one or more cameras or imaging devices, or the like, or some combination thereof) using a communication network interface to receive a plurality of media and training datasets. Examples of the communication network may be, but are not limited to, the Internet, a wired network (a Wide Area Network (WAN), Local Area Network (LAN), Ethernet and the like), a wireless network (a Wi-Fi network, a cellular network, a Wi-Fi Hotspot, Bluetooth, ZigBee and so on) and the like, or some combination thereof. The plurality of media may be received over this network for labelling.

Training datasets comprise a first training dataset and a second training dataset. The first training dataset may include a plurality of manually annotated media. Each of the plurality of manually annotated media may include one or more objects, which have been labelled manually by a user. The second training dataset may include training media without including the labelled/annotated objects. The first training dataset and the second training dataset may be captured in various backgrounds, lighting conditions, environments, angles, and so on. Embodiments herein use the terms "first training dataset", "manually annotated media", "manually annotated first media", "first media", and so on, interchangeably to refer to media/dataset which includes the manually labelled objects. Embodiments herein use the terms "second training dataset", "unannotated second media," "second media", and so on, interchangeably to refer to media/dataset which includes the objects not labelled/annotated.

The memory (302) referred herein may include at least one of, but is not limited to, NAND, embedded Multimedia Card (eMMC), Secure Digital (SD) cards, micro-SD cards, Compact Flash (CF) cards, Universal Serial Bus (USB), Serial Advanced Technology Attachment (SATA), solid-state drive (SSD), and so on. The memory (302) may also include one or more computer-readable storage media. The memory (302) may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (302) may, in some examples, be considered a non-transitory storage medium. The term "non-transitory" may indicate that the storage medium is not embodied in a carrier wave or a propagated signal. However, the term "non-transitory" should not be interpreted to mean that the memory (302) is non-movable. In certain examples, a non-transitory storage medium may store data that can, over time, change (e.g., in Random Access Memory (RAM) or cache).

The memory (302) may store at least one of, but is not limited to, the plurality of media, the training datasets, labels of the one or more objects, an automatic (auto)-labelling engine (302a), controller (308) program instructions, and the like. The label may correspond to a tag/identifier that uniquely identifies the associated object.

The auto-labelling engine (302a) may be a neural network module algorithm, which may be trained by the controller (308) to automatically label the one or more objects in the plurality of media or in a very large dataset. Examples of the auto-labelling engine (302a) include, but are not limited to, a convolutional neural network (CNN) model, a machine learning model, an Artificial Intelligence (AI) model, a deep neural network (DNN) model, a recurrent neural network (RNN) model, a restricted Boltzmann Machine (RBM) model, a deep belief network (DBN) model, a bidirectional recurrent deep neural network (BRDNN) model, generative adversarial networks (GAN), a regression based neural network, a deep reinforcement model (with ReLU activation), a deep Q-network, a You only look once (YOLO) model, and so on. The auto-labelling engine (302a) may include a plurality of layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients.

A topology of the layers of the auto-labelling engine (302a) may vary based on a type of the auto-labelling engine (302a). In an example, the auto-labelling engine (302a) may include an input layer, an output layer, and a hidden layer. The input layer receives an input (for example: the training datasets) and forwards the received input to the hidden layer. The hidden layer transforms the input received from the input layer into a representation, which can be used for generating the output in the output layer. The hidden layers extract useful/low level features from the input, introduce non-linearity in the network and reduce a feature dimension to make the features equivariant to scale and translation. The nodes of the layers can be fully connected via edges to the nodes in adjacent layers. The input received at the nodes of the input layer can be propagated to the nodes of the output layer via an activation function that calculates the states of the nodes of each successive layer in the network based on coefficients/weights respectively associated with each of the edges connecting the layers. Embodiments herein use the terms such as "neural network model", "learning model", "media labelling and management tool", and so on, interchangeably to refer to a model which has been trained and used for automatically labelling the media.

The interface (304) may be configured to enable the electronic device (300) to communicate with one or more external electronic device entities using an interface supported by the communication network. Examples of the interface may be, but are not limited to, a wired interface, a wireless interface, any structure supporting communications over a wired or wireless connection, or some combination thereof.

The display (306) is configured to enable a user to interact with the electronic device (300). The display (306) is adapted to receive from the controller (302) the annotated media/first training dataset representation, wherein the annotated media includes the one or more objects labelled manually by the user, and visually represent to the user the automatically labelled objects in the media.

The controller (308) is adapted to automatically label the objects in the given media. The controller (308) referred herein may include one or a plurality of processors. One or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU), or some combination thereof.

The controller (308) trains the auto-labelling engine (302a) and then uses the trained auto-labeling engine (302a) to automatically draw the one or more virtual bounding boxes around the one or more objects detected in the media. Thereby, automatically labelling the one or more detected objects in the media.

In this embodiment the controller (308) trains the auto-labelling engine (302a) in a plurality of iterations, until a performance of the auto-labelling engine (302a) is satisfactory. In each iteration the controller (308) trains the auto-labelling engine (302a) based on the first training dataset/plurality of manually annotated media objects, and a second training dataset/training media object set.

For training the auto-labelling engine (302a), the controller (308) receives the first training dataset and the second training dataset from the memory (302) or from an external entity. The controller (308) initiates a first iteration of training the auto-labelling engine (302a) and then feeds the received first training dataset and second training dataset to the auto-labelling engine (302a). The auto-labelling engine (302a) automatically draws the one or more virtual bounding boxes around the one or more objects detected in each media of the second training dataset to label the corresponding one or more objects. The auto-labelling engine (302a) takes one image at a time and generates output values (bounding box coordinate values and object class confidence score). This output along with the respective image is sent to a user interface display (306), which uses a visualizer function to overlay the bounding boxes on the image.

The auto-labelling engine (302a) automatically draws the bounding boxes around the objects present in each media of the second training dataset by learning the labels of the objects present in the plurality of manually annotated media of the first training dataset. The auto-labelling engine (302a) can utilize a supervised learning approach to learn labels of the objects. The auto-labelling engine (302a) takes an image as an input and outputs bounding box coordinates and an object class probability score for detected objects. The auto-labelling engine (302a) compares these bounding box coordinates with the manually labeled ground truth bounding box coordinates to determine a loss value. The learning process attempts to minimize the loss value to a number range between 0 and 0.5, which can be done through a machine learning approach called back propagation.

On labeling the objects in each media of the second training dataset, the controller (308) checks the performance of the auto-labelling engine (302a). Checking the performance of the auto-labelling engine (302a) refers to determining if each media object of the second training dataset has been labelled correctly or not. In an example, the controller (308) may allow the user to check the performance of the auto-labelling engine (302a). If the performance of the auto-labelling engine (302a) is satisfactory (i.e., the plurality of media objects of the second training dataset have been labelled correctly), the electronic device (300) uses the auto-labelling engine (302a) to label the objects in the media received for labelling or to label the remaining training datasets. A sample set of auto-labeled objects is sent to the user interface display (306) to be manually inspected by a user for bounding box accuracy. Accuracy is determined to be satisfactory if the object lies inside the bounding box and the bounding box fits the object without large gaps between its edges and the object perimeter. The gap threshold depends on user preference. In general, a lower gap improves the accuracy of the bounding box.

If the performance of the auto-labelling engine (302a) is deemed not satisfactory based upon established criteria (e.g., the plurality of media objects of the second training dataset have not been labelled correctly), the controller (308) further trains the auto-labelling engine (302a) in the successive iteration(s) to label the objects. In each successive iteration, the controller (308) decreases a number of manually annotated media used in a previous approach for training the auto-labelling engine (302a).

In an example herein, the controller (308) may use four iterations/stages to train the auto-labelling engine (302a), thereby increasing a precision of the auto-labelling of the objects. In an example, in a first iteration/stage, the controller (308) may use a minimum of 200 manually annotated media per object for training the auto-labelling engine (302a). During each of the successive/next three iterations/stages, the controller (308) uses 50% of the number of media used in the previous iteration/stage. With the four iterations/stages of training the auto-labelling engine (302a), the controller (308) may use the trained auto-labelling engine (302a) to label the objects in the given media automatically. The trained auto-labelling engine (302a) may be a trained model in which a number of layers, a sequence for processing the layers and parameters related to each layer may be known and fixed for labeling the media in the objects. Examples of the parameters may be, but are not limited to, activation functions, biases, input weights, output weights, height, width, and so on.

In an embodiment, on training the auto-labelling engine (302a), the controller (308) may deploy the trained auto-labelling engine (302a) onto a target device (for example, at least one computing device, a device used for training the auto-labelling engine, or the like). The target device may use the trained auto-labelling engine (302a) to automatically label the objects in the given media.

The controller (308) may also be configured to receive the media from the user or from at least one external entity for labelling. The controller (308) uses the trained auto-labelling engine (302a) to draw the bounding boxes around the one or more objects present in the received media for labelling the corresponding one or more objects.

Thus, the media may be automatically labelled using the auto-labelling engine (302a) with a very minimal manual effort.

Figure 4:
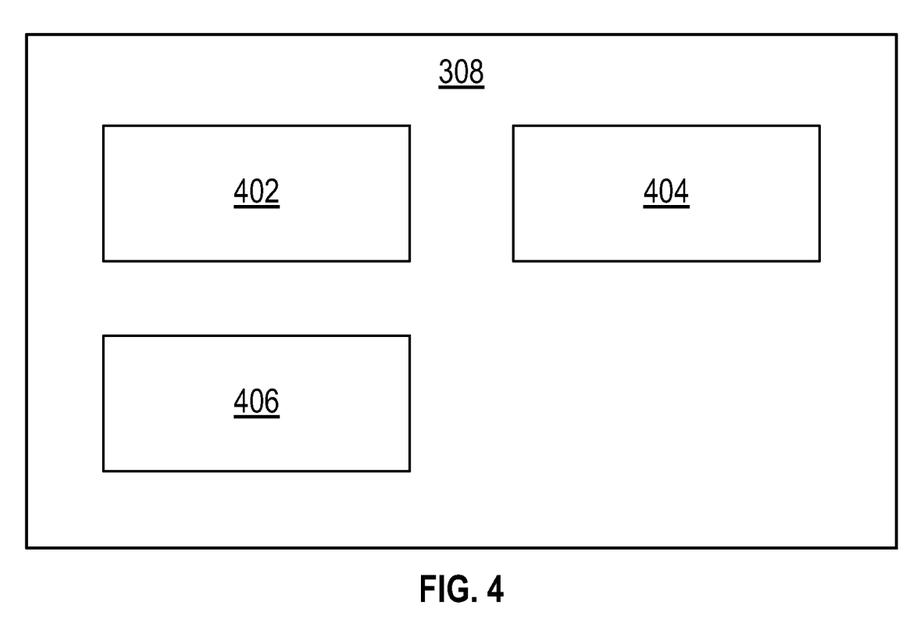
FIG. 4 depicts a block diagram representation of a controller of the electronic device for automatically labelling the media, according to embodiments as disclosed herein.

FIG. 4 depicts the controller (308) of the electronic device (300) for automatically labelling the media objects, according to embodiments as disclosed herein. The controller (308) includes a training module (402), and a performance checking module (404) for training the auto-labelling engine (302a) in the iterative approach to automatically label the given media objects. The controller (308) also includes a labelling module (406) to automatically label the given media using the trained auto-labelling engine (302a).

The training module (402) may be configured to train the auto-labelling engine (302a) based on the first training dataset and the second training dataset. The first training dataset includes the plurality of manually annotated media. The second training dataset includes the plurality of media without annotation. The training module (402) feeds the first training dataset and the second training dataset to the auto-labelling engine (302a). The training module (402) further enables the auto-labelling engine (302a) to label each media of the second training dataset by drawing the bounding boxes around the objects/second objects in each media of the second training dataset. The auto-labelling engine (302a) draws the bounding boxes around the second objects based on the labels associated with the objects/first objects present in the plurality of manually annotated media.

The performance checking module (404) may be configured to check the performance of the auto-labelling engine (302a), on labelling the media of the second training dataset based on the plurality of manually annotated media, and accordingly determine to further train the auto-labelling engine (302a) in the iterations. The performance checking module (404) allows the user to check the performance of the auto-labelling engine (302a) by reviewing the labelling of each media of the second training dataset. If the performance of the auto-labelling engine (302a) is satisfactory, the performance checking module (404) may provide the instructions to the labelling module (406) or the training module (402) to use the trained auto-labelling engine (302a) for labelling the given media or the remaining training datasets, respectively. If the performance of the auto-labelling engine (302a) is not satisfactory, the performance checking module (404) provides instructions to the training module (402) for further training of the auto-labelling engine (302a) using the reduced number of manually annotated media used in the previous iteration for training the auto-labelling engine (302a).

The labelling module (406) may be configured to receive the media and label the received media using the auto-labelling engine (302a). The labelling module (406) feeds the received media to the trained auto-labelling engine (302a), which labels the objects present in the media by drawing the bounding boxes around the objects present in the media.

FIGS. 3 and 4 show exemplary embodiments of the electronic device (300), but it is to be understood that other embodiments are not limited thereon. In other embodiments, the electronic device (300) may include less or a greater number of units. Further, the labels or names of the units are used only for illustrative purpose and does not limit the scope of the embodiments herein. One or more units can be combined together to perform same or substantially similar function in the electronic device (300).

Figure 5:
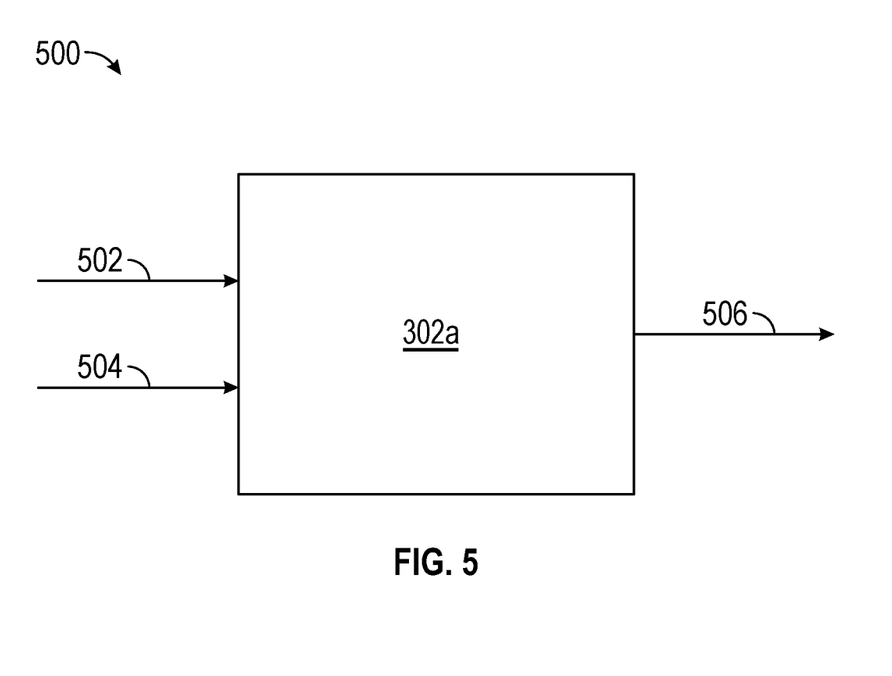
FIG. 5 is a diagram depicting automatic labelling of the media, according to embodiments as disclosed herein.

FIG. 5 is an example conceptual diagram (500) depicting automatic labelling of the media, according to embodiments as disclosed herein. Received by the auto-labelling engine (302a) are a manually labelled first media dataset (502) and unlabelled second media dataset (504). Output includes an auto-labelled second media dataset (506).

The electronic device (300) trains an auto-labelling engine (302a) and uses the trained auto-labelling engine (302a) to automatically draw the one or more bounding boxes around the one or more objects present in the media. Thereby, automatically labelling the one or more objects in the media. The electronic device (300) iteratively trains the auto-labelling engine (302a) based on a combination of the first training dataset and the second training dataset until the performance of the auto-labelling engine (302a) is satisfactory. The training of the auto-labelling engine (302a) involves enabling the auto-labelling engine (302a) to label each media in the second training dataset based on the plurality of manually annotated media of the first training dataset.

Consider an example scenario, wherein the electronic device (300) receives 200 manually annotated images/media per object (which includes the objects which have been labelled manually by the user) as the first training dataset from the user. On receiving the 200 manually annotated images, the electronic device (300) initiates a first iteration of training the auto-labelling engine (302a). In the first iteration, the electronic device (300) provides the 200 manually annotated images (iteration 1: 200 images) and the plurality of images/media (without annotated/labelled) of the second training dataset to the auto-labelling engine (302a) for training. The auto-labelling engine (302a) draws bounding boxes around the objects present in each image of the second training dataset by learning the labels associated with the objects present in the 200 manually annotated images. The bounding boxes that have been draw around the objects present in each image may be used to label the corresponding objects. On labelling each image of the second training dataset in the first iteration, the electronic device (300) checks the performance of the auto-labelling engine (302a) by reviewing the labeling of each image of the second training dataset. In an example herein, consider that the performance of the auto-labelling engine (302a) is not satisfactory. In such a scenario, the electronic device (300) initiates a second iteration of training the auto-labelling engine (302a). In the second iteration, the electronic device (300) provides only manually annotated images (i.e., 50% of the manually annotated images used in the first iteration (iteration 2: 100 images)) and the second training dataset including the images without annotated to the auto-labeling engine (302a). The auto-labelling engine (302a) labels the images of the second training dataset based on the 100 manually annotated images.

On labelling each image of the second training dataset in the second iteration, the electronic device (300) checks the performance of the auto-labelling engine (302a) by reviewing the labeling of each image of the second training dataset and determines that the performance of the auto-labelling engine (302a) is not satisfactory. In such a scenario, the electronic device (300) initiates a third iteration of training the auto-labelling engine (302a). In the third iteration, the electronic device (300) provides only 50 manually annotated images (i.e., 50% of the manually annotated images used in the second iteration (iteration 3: 50 images)) and the second training dataset including the images without annotated to the auto-labeling engine (302a). The auto-labelling engine (302a) labels the images of the second training dataset based on the 50 manually annotated images.

On labelling each image of the second training dataset in the third iteration, the electronic device (300) checks the performance of the auto-labelling engine (302a) by reviewing the labeling of each image of the second training dataset and determines that the performance of the auto-labelling engine (302a) is not satisfactory. In such a scenario, the electronic device (300) initiates a fourth iteration of training the auto-labelling engine (302a). In the fourth iteration, the electronic device 200 provides only 25 manually annotated images (i.e., 50% of the manually annotated images used in the third iteration (iteration 4: 25 images)) and the second training dataset including the images without annotated to the auto-labeling engine (302a). The auto-labelling engine (302a) labels the images of the second training dataset based on the 25 manually annotated images.

On labelling each image of the second training dataset in the fourth iteration, the electronic device (300) determines that the auto-labelling engine (302a) has been trained successfully. The electronic device (300) uses the trained auto-labelling engine (302a) to label the given media. The trained auto-labelling engine (302a) is the neural network model in which the parameters of each layer may be fine-tuned to achieve the best auto-labelling performance.

In an embodiment herein, a ratio of number of images to an iteration number in combination may be used to fine tune the parameters of the auto-labelling engine (302a), which enables to achieve the best auto labelling performance.

In an example scenario, the electronic device (300) trains the auto-labelling engine (302a) by:
  tuning a batch size of the auto-labelling engine to 64;
  changing subdivisions of the auto-labelling engine to 16;
  determining maximum (max) batches depending on a number of classes. For example, if the classes are less than 3, the max batches may be determined as 6000 and if classes are more than 3, the max batches may be determined as 2000*number of classes;
  changing a number of steps to 80%, 90% of the max batches, wherein step refers to one gradient update (i.e. one update to neural network values) during the training process and the neural network processing a batch of images (batch size 64) as mentioned above (during each step);
  determining width, height of layers of the auto-labelling engine (302a) in multiples of 32;
  changing a number of classes to current number of classes in each first layer (for example, a yolo layer) of the auto-labelling engine (302a);
  changing a number of filters=(number of classes+5)*3 (in a second layer (for example, a convolutional layer) right before the first layer only);
  wherein, the batch size, subdivisions, the classes, the width, the height, the number of filters, and so on, may be the parameters/configuration parameters of the auto-labelling engine (302a). With respect to the above tuning of the parameters of the auto-labelling engine (302a), an accuracy of 85 mean average precision (mAP) and a loss between 0 and 0.5 may be achieved. It is understood that embodiments herein are not limited to above-described example of tuning the parameters of the auto-labelling engine and may include two or more various ways (including the above-described example) of tuning the parameters of the auto-labelling engine (302a), at a same time.

Figure 6:
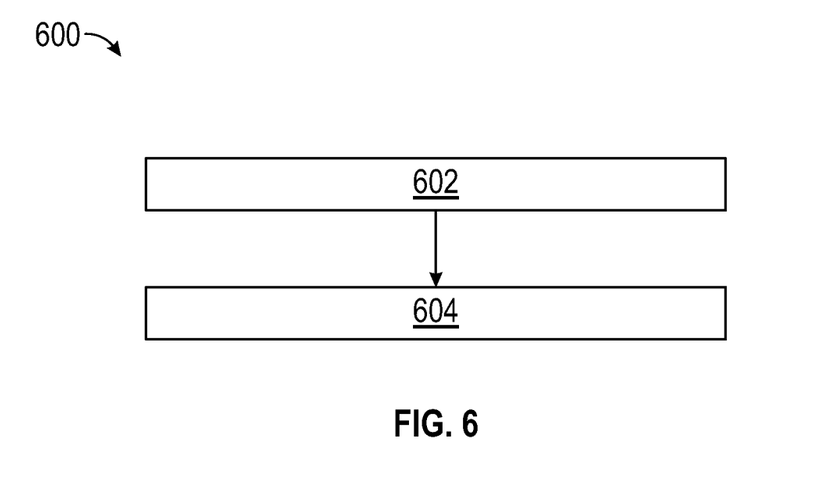
FIG. 6 is a flow diagram depicting a method for automatically labelling the media, according to embodiments as disclosed herein.

FIG. 6 is an example flow diagram (600) depicting a method for automatically labelling the media, according to embodiments as disclosed herein.

At step (602), the method includes training, by the electronic device (300), the auto-labelling engine (302a) based on the combination of the first training dataset and the second training dataset. The first training dataset includes the plurality of manually annotated first media. The second training dataset includes the plurality of second media without annotation.

At step (604), the method includes using, by the electronic device, the trained auto-labelling engine to label at least one object in the at least one media received for labelling. The various actions in method (600) may be performed in the order presented, in a different order or simultaneously.

Figure 7:
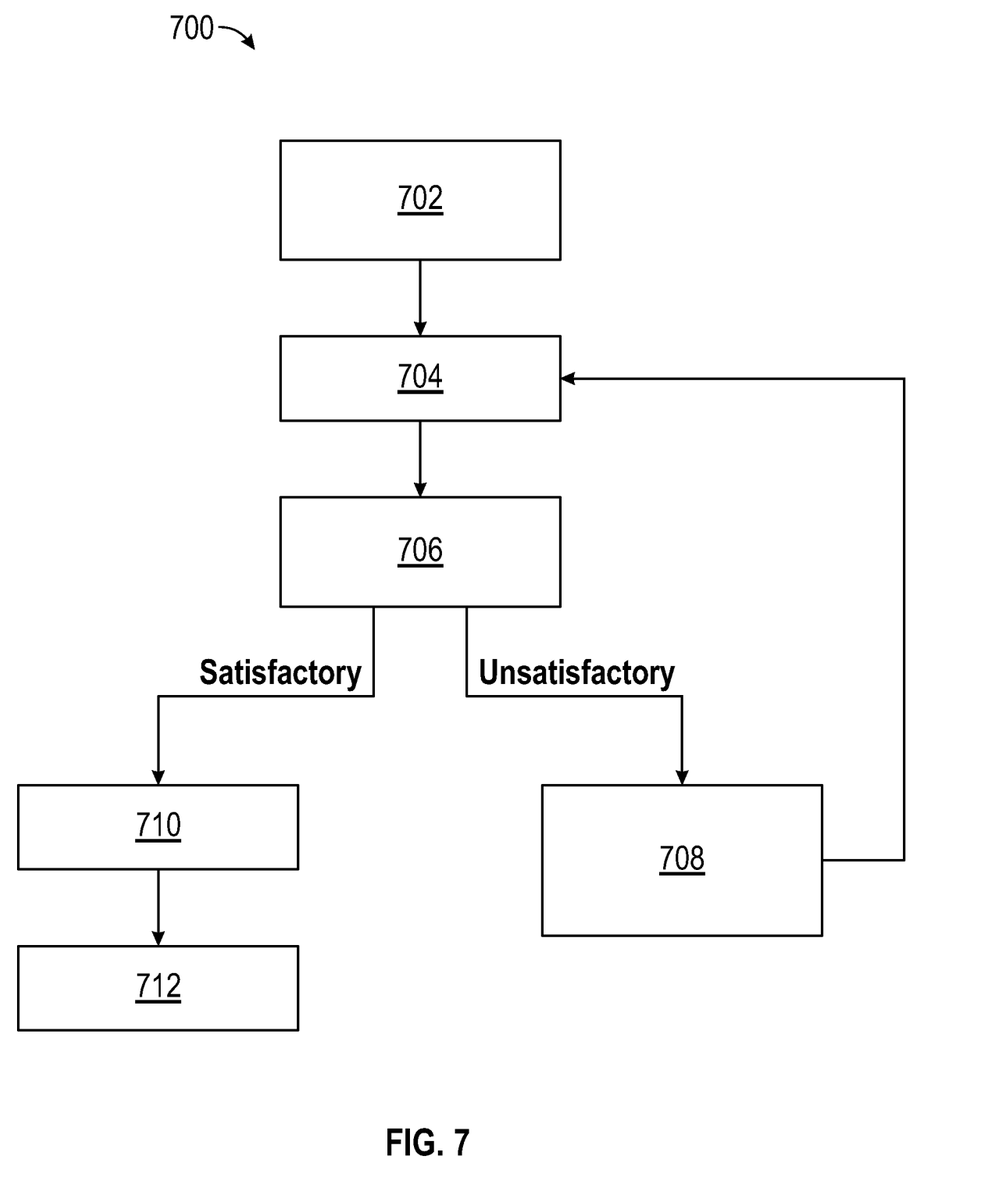
FIG. 7 is a flow diagram depicting a method for training an auto-labelling engine to automatically label the objects in the media, according to embodiments as disclosed herein.

FIG. 7 is an example flow diagram (700) depicting a method for training the auto-labelling engine (302a) to automatically label the objects in the media, according to embodiments as disclosed herein.

At step (702), the electronic device (300) receives the manually annotated media as a first training dataset for the first iteration of training the auto-labelling engine (302a).

At step (704), the electronic device (300) trains the auto-labelling engine (302a) to label each media object of a second training dataset (second objects) based on the labels of the objects present in the manually annotated media of the first training dataset (first objects). Training includes second object boundary detection, framing, and corresponding labelling following automated direct comparisons made with the annotated first objects.

At step (706), the electronic device (300) checks the performance of the auto-labelling engine (302a) by allowing the operator/user to manually review the labelling of each media second object of the second training dataset in view of the first object labels of the first training dataset. Upon review, the user inputs through the user interface a rating to the electronic device (300) concerning the determined satisfactory/unsatisfactory (good/not good) nature of the auto-labelling efforts.

If the performance of the auto-labelling engine (302a) is deemed to be unsatisfactory, at step (708), the electronic device (300) initiates a subsequent iteration of training the auto-labelling engine (302a) using a reduced number of manually annotated media than was used in the previous iteration (for example, 50% fewer), and the auto-labelling engine (302a) is once again trained and its second-object labelling output evaluated by the user. This iterative process continues until the second training dataset object labels are determined by the user to be satisfactory. In another embodiment, the number of iterations of training is restricted.

If the performance of the auto-labelling engine (302a) is deemed satisfactory, at step (710) the electronic device (300) uses the trained auto-labelling engine (302a) to automatically label the remaining dataset media objects if additional objects remain, or an additional dataset containing unlabelled media objects.

At step (712) the electronic device (300) stores the labels associated with the objects in the labelled media in the memory (302) for subsequent use, including use as a training dataset. The metadata labels may be retained separate from the labelled object data so long as a database index or key associates the label with the associated object. Or, the original object data may be stored with the label data, for example, in a single database record. The various actions in method (700) may be performed in the order presented, in a different order or simultaneously.

In another embodiment, in addition to labelling a second training dataset object, it is also possible for the auto-labelling engine to detect the object edges and draw an appropriately sized bounding-box (frame) around the object using the techniques described herein.

The embodiments disclosed herein can be implemented through at least one software program running on at least one hardware device and performing network management functions to control the elements. The elements shown in FIG. 3 and FIG. 4 can be at least one of the hardware devices, or a combination of hardware device and software module.

The embodiments disclosed herein describe methods and systems for automatically labelling media. Therefore, it is understood that the scope of the protection is extended to such a program and in addition to a computer readable medium, having a message therein, such computer readable storage means contain program code means for implementation of one or more steps of the method, when the program runs on a server or mobile device or any suitable programmable device. The method is implemented in a preferred embodiment through or together with a software program written in e.g., Very high-speed integrated circuit Hardware Description Language (VHDL), another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

As indicated above, aspects of this invention pertain to specific "method functions" implementable through various computer systems. In an alternate embodiment, the invention may be implemented as a computer program product for use with a computer system. Those skilled in the art will readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent embodiments of the present invention.

The invention may be embodied in other specific forms without departing from the spirit or essential characteristics thereof. The described embodiments are therefore to be considered in all respects as illustrative and not restrictive. Accordingly, the scope of the invention is established by the appended claims rather than by the foregoing description. All changes coming within the meaning and range of equivalency of the claims are embraced therein. Further, the recitation of method steps does not denote a limiting sequence for execution of the steps. Such method steps may therefore be performed in a sequence other than that recited unless the claim expressly states otherwise.

We claim:

1. A system for automatically labelling electronic media, the system comprising:
 a first electronic device including:
 a memory;
 an auto-labelling engine neural network;
 an interface;

a display; and a programmable controller in communication with the memory, interface, and display, the controller adapted to execute stored program instructions for performing the method steps comprising:

receiving a first training dataset including a plurality of annotated media first objects, each of the plurality of annotated media first objects including a corresponding label;

receiving a second training dataset including a plurality of unannotated media second objects;

training the auto-labelling engine neural network to label each of the plurality of unannotated media second objects based upon comparisons with the labels of the annotated media first objects, wherein the auto-labelling engine neural network assigns a label to each of the plurality of unannotated media second objects;

presenting, with the display, the labels of the plurality of unannotated media second objects and the labels of the annotated media first objects to a user for manual review, and accepting from the user a performance indication corresponding to a satisfactory or an unsatisfactory rating concerning the manual review;

if the performance indication is unsatisfactory, iterating the previous two method steps with a reduced number of the annotated media first objects until a satisfactory performance indication is achieved; and labelling, with the auto-labelling engine neural network, any unlabelled unannotated media second objects.

2. The system of claim 1, the system further comprising:
a second electronic device communicatively coupled via the interface to the first electronic device to provide the first training dataset and the second training dataset upon which the first electronic device operates.

3. The system of claim 1, the method steps further comprising:
drawing, with the auto-labelling engine neural network, a bounding box around at least one of the labelled plurality of unannotated media second objects, the bounding box visible to the user with the display.

4. The system of claim 1, the method steps further comprising:
receiving a third media dataset including a plurality of unannotated third objects;
labelling each of the plurality of unannotated third objects with the trained auto-labelling engine neural network; and
drawing a bounding box around at least one of the labelled plurality of unannotated third objects.

5. The system of claim 1, wherein the trained auto-labelling engine is a neural network number of training iterations is determined using a ratio of a number of manually annotated first media to a number of training iterations.

6. A method performed by a programmable electronic device for automatically labelling media, the device executing stored program instructions to effect the method steps comprising:

iteratively training, by an electronic device controller, an auto-labelling engine neural network using a combination of a plurality of manually annotated first media and a plurality of unannotated second media, the iterative training steps comprising:

labelling at least one second media object in the plurality of unannotated second media using the plurality of manually annotated first media;

determining, by a user, a satisfactory or unsatisfactory performance rating of the auto-labelling engine neural network by reviewing the label of the at least one second media object and assigning a satisfactory or unsatisfactory rating;

reducing a number of manually annotated first media from the number used in a previous iteration if the auto-labelling engine neural network performance rating is unsatisfactory; and repeating the previous iterative training steps until the auto-labelling engine neural network performance rating is satisfactory; and, once satisfactory, using the trained auto-labelling engine neural network to label at least one additional object in a plurality of unlabelled additional media received for labelling.

7. The method of claim 6, the method steps comprising:
drawing, with the auto-labelling engine neural network, at least one bounding box around the at least one additional object.

8. The method of claim 6, the iterative training steps comprising:
drawing, with the auto-labelling engine neural network, at least one bounding box around the labelled second media object using at least one label of a first media object present in the plurality of manually annotated first media.

9. The method of claim 6, wherein the number of iterative training steps is determined using a ratio of a number of manually annotated first media to a number of training iterations.

10. A system comprising:
at least one electronic device including a programmable controller adapted to effect an auto-labelling engine and a user interface for user interaction with same, the controller adapted to execute non-transitory program instructions for iteratively training an auto-labelling engine neural network using a combination of a plurality of manually annotated first media and a plurality of unannotated second media, the iterative training steps comprising:

labelling at least one second media object in the plurality of unannotated second media using the plurality of manually annotated first media;

determining, by a user, a satisfactory or unsatisfactory performance rating of the auto-labelling engine neural network by reviewing the label of the at least one second media object and assigning a satisfactory or unsatisfactory rating;

reducing a number of manually annotated first media from the number used in a previous iteration if the auto-labelling engine performance rating is unsatisfactory; and repeating the previous iterative training steps until the auto-labelling engine neural network performance rating is satisfactory; and, once satisfactory, using the trained auto-labelling engine neural network to label at least one additional object in a plurality of unlabelled additional media received for labelling.

11. The system of claim 10, the iterative training steps comprising:
drawing, with the auto-labelling engine, at least one bounding box around the additional object.

12. The system of claim 10, the iterative training steps comprising:
drawing, with the auto-labelling engine, at least one bounding box around the second media object using at least one label of a first media object present in the plurality of manually annotated first media.

13. The system of claim 10 wherein the number of iterative training steps is determined using a ratio of a number of manually annotated first media to a number of training iterations.

* * * * *